United States Patent
Yamashita et al.

(10) Patent No.: US 8,101,899 B2
(45) Date of Patent: Jan. 24, 2012

(54) IMAGE PICKUP APPARATUS

(75) Inventors: Yuichiro Yamashita, Ebina (JP);
Yusuke Onuki, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 288 days.

(21) Appl. No.: 12/574,618

(22) Filed: Oct. 6, 2009

(65) Prior Publication Data

US 2010/0090092 A1   Apr. 15, 2010

(30) Foreign Application Priority Data

Oct. 9, 2008   (JP) .................................. 2008-262998

(51) Int. Cl.
*H01L 27/00*   (2006.01)
(52) U.S. Cl. ..................... 250/208.1; 348/300; 348/302; 257/292
(58) Field of Classification Search ............... 250/208.1, 250/214.1; 348/294, 297, 299–302, 308; 257/291, 292
See application file for complete search history.

(56) References Cited

U.S. PATENT DOCUMENTS

| | | | |
|---|---|---|---|
| 2006/0157759 A1 | 7/2006 | Okita et al. | |
| 2006/0219866 A1* | 10/2006 | Egawa et al. | ............... 250/208.1 |
| 2010/0091157 A1* | 4/2010 | Yamashita et al. | ............ 348/300 |

FOREIGN PATENT DOCUMENTS

| | | |
|---|---|---|
| JP | 2006-197382 A | 7/2006 |
| JP | 2008-099158 A | 4/2008 |

* cited by examiner

*Primary Examiner* — Kevin Pyo
(74) *Attorney, Agent, or Firm* — Canon U.S.A., Inc. IP Division

(57) ABSTRACT

An apparatus includes pixels each having a transistor that transfers a charge of a photoelectric conversion unit, an amplification unit that receives the transferred charge, a scanning unit that supplies, to the transistor, a conductive pulse, a non-conductive pulse, and an intermediate-level pulse having a peak value between the conductive pulse and the non-conductive pulse, a generating unit that generates an image signal using a signal based on a charge transferred in response to the conductive and intermediate-level pulses, and a control unit that changes at least one of a pulse width of the intermediate-level pulse and the peak value in accordance with information on the detected temperature. The conductive and intermediate-level pulses are supplied to the transistor during a light shielding period of the photoelectric conversion unit.

11 Claims, 14 Drawing Sheets

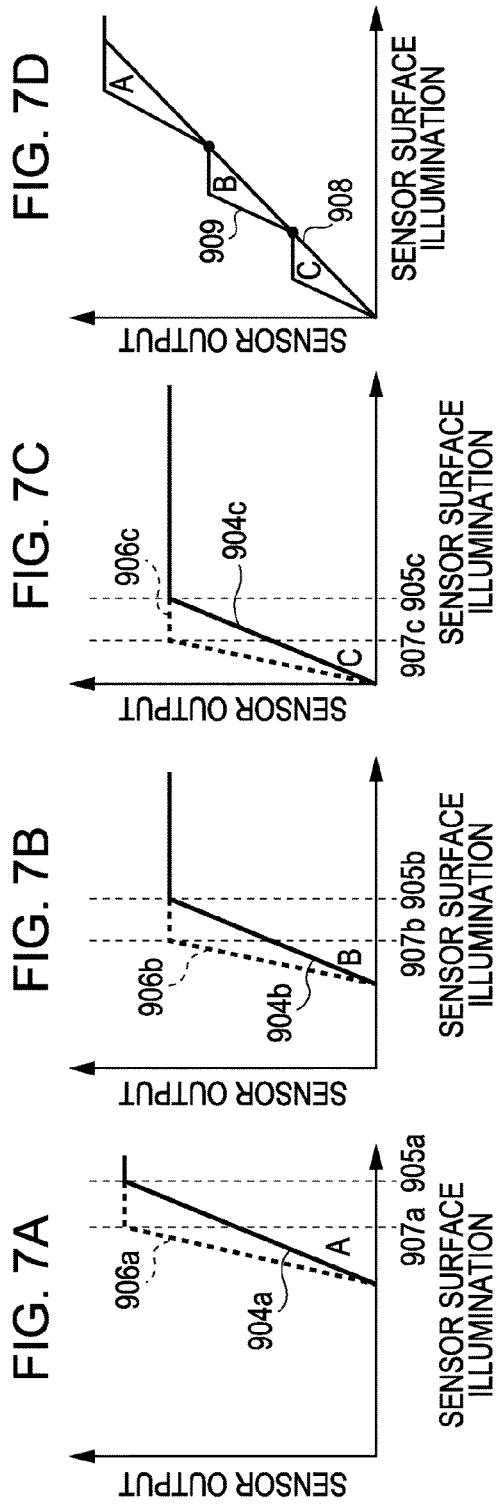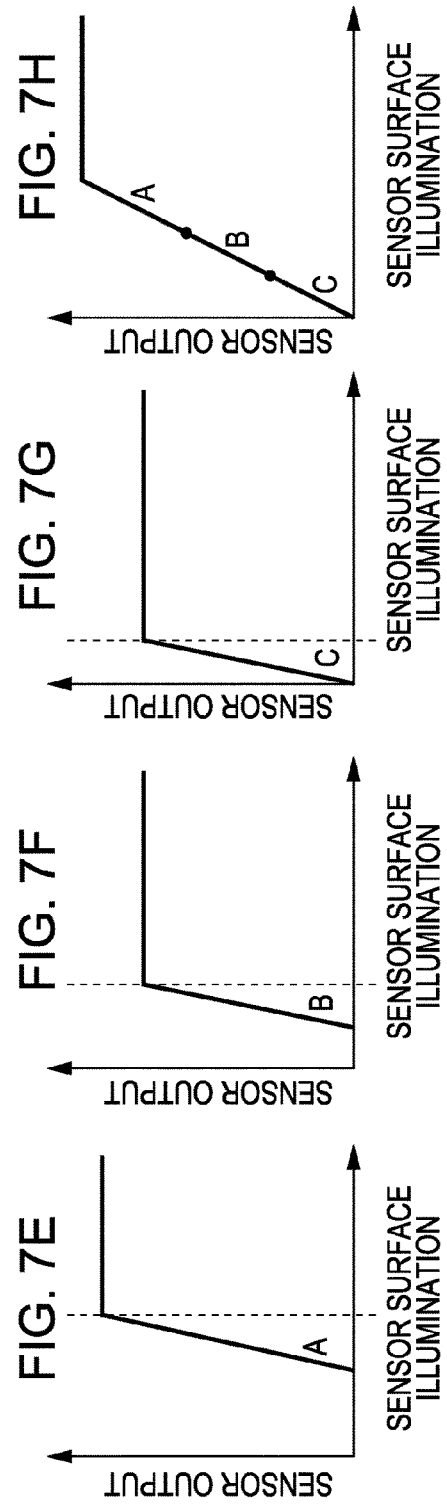

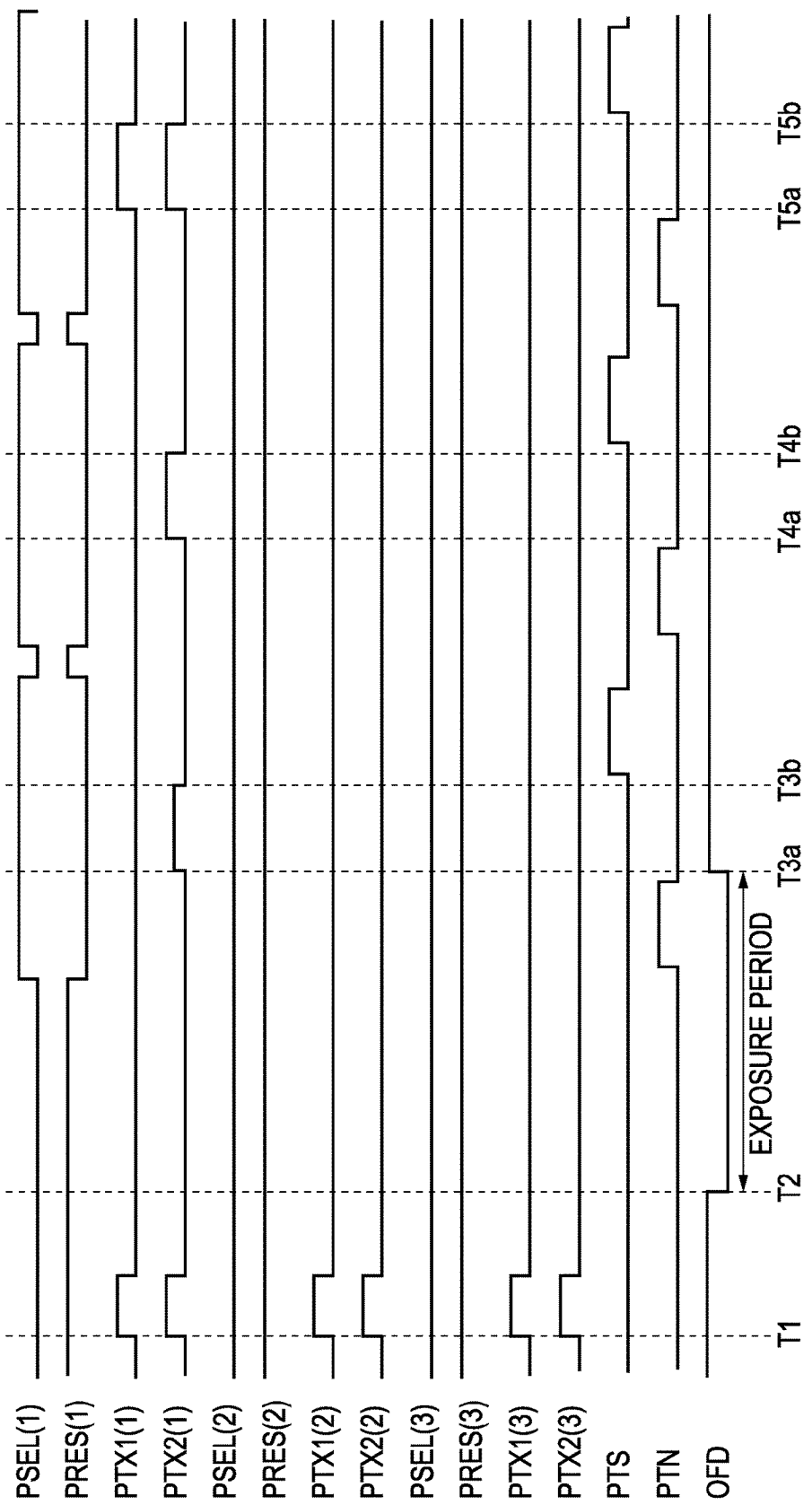

IMAGE PICKUP APPARATUS

BACKGROUND OF THE INVENTION

1. Field of the Invention

The present invention relates to an image pickup apparatus and, more specifically, to the technology of extending a dynamic range.

2. Description of the Related Art

There are technologies of extending a dynamic range in image pickup apparatuses. Japanese Patent Laid-Open No. 2006-197382 (hereinafter referred to as Patent Document 1) discloses an image pickup apparatus that aims at extending a dynamic range without a decrease in image quality. Specifically, the image pickup apparatus includes a transfer-gate control portion that controls a potential of a transfer gate to introduce a part of charges flowing from a photoelectric conversion portion into a floating diffusion portion and an image-signal generating portion that generates an image signal based on charges stored in the photoelectric conversion portion and charges flowed into the floating diffusion portion.

Japanese Patent Laid-Open No. 2008-099158 (hereinafter referred to as Patent Document 2) discloses a configuration in which intermediate voltages having the same voltage value are supplied a plurality of times as a control voltage from a driver circuit to a gate electrode of a transfer transistor in synchronization with column selection and at that time signal charges transferred by the transfer transistor are read out at least twice. Each of the intermediate voltages supplied to the transfer transistor is transferred to a floating diffusion (FD) region, and a potential in the FD region is read out as a signal level. In a different embodiment, a configuration using a mechanical shutter is disclosed. In that configuration, a dummy transfer is performed during the opening of the mechanical shutter, and an intermediate voltage is transferred and read out during the closing of the mechanical shutter.

One possible method for extending a dynamic range in an image pickup apparatus is an increase in saturation charge quantity of the photoelectric conversion portion. However, if the saturation charge quantity of the photoelectric conversion portion is simply increased, not all charges may be read out in a readout circuit disposed downstream of the photoelectric conversion portion or a signal based on a readout charge may be unable to be used in image formation.

In Patent Document 1, light is incident on the photoelectric conversion portion, charges flowed from the photoelectric conversion portion during the period of generating signal charges for use in image formation (the exposure period) in the photoelectric conversion portion are transferred to the FD region. That is, on the assumption of generation of charges exceeding the saturation charge quantity of the photoelectric conversion portion during the exposure period, charges are transferred during the exposure period. Thus, if strong light is given after a last readout operation during the exposure period and charges are stored near the saturation charge quantity of the photoelectric conversion portion, not all charges may be used in image formation depending on the dynamic range of the downstream readout circuit.

In Patent Document 2, if strong light is entered, a dummy transfer is performed and a part of generated charges is ejected through a reset switch. Therefore, there may be an issue in terms of signal continuity. In addition, no discussion is made about variations in transfer efficiency from the photoelectric conversion portion depending on temperature conditions of the exterior and the gain of the readout circuit disposed downstream of the photoelectric conversion portion.

SUMMARY OF THE INVENTION

According to an aspect of the present invention, an apparatus includes a plurality of pixels, an amplification unit, a scanning unit, a generating unit, a detecting unit, and a control unit. Each of the plurality of pixels has a photoelectric conversion unit and a transfer transistor that transfers a charge of the photoelectric conversion unit. The amplification unit is configured to receive the transferred charge. The scanning unit is configured to supply, to a gate of the transfer transistor, a conductive pulse, a non-conductive pulse, and an intermediate-level pulse having a peak value between the conductive pulse and the non-conductive pulse. The generating unit is configured to generate an image signal using a signal based on a charge transferred in response to the conductive pulse and the intermediate-level pulse. The detecting unit is configured to detect a temperature. The control unit is configured to change at least one of a pulse width of the intermediate-level pulse and the peak value in accordance with information on the detected temperature. The conductive pulse and the intermediate-level pulse are supplied to the transfer transistor during a light shielding period of the photoelectric conversion unit.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

FIGS. 7A to 7H illustrate relationships between surface illumination and output according to the second embodiment.

FIG. 12 illustrates driving pulses according to the fifth embodiment.

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention are described below with reference to the accompanying drawings. First, a block diagram of a solid-state image pickup apparatus that can be shared by the embodiments described below and an equivalent circuit diagram of pixels are described with reference to FIGS. 1 and 2.

Figure 1:
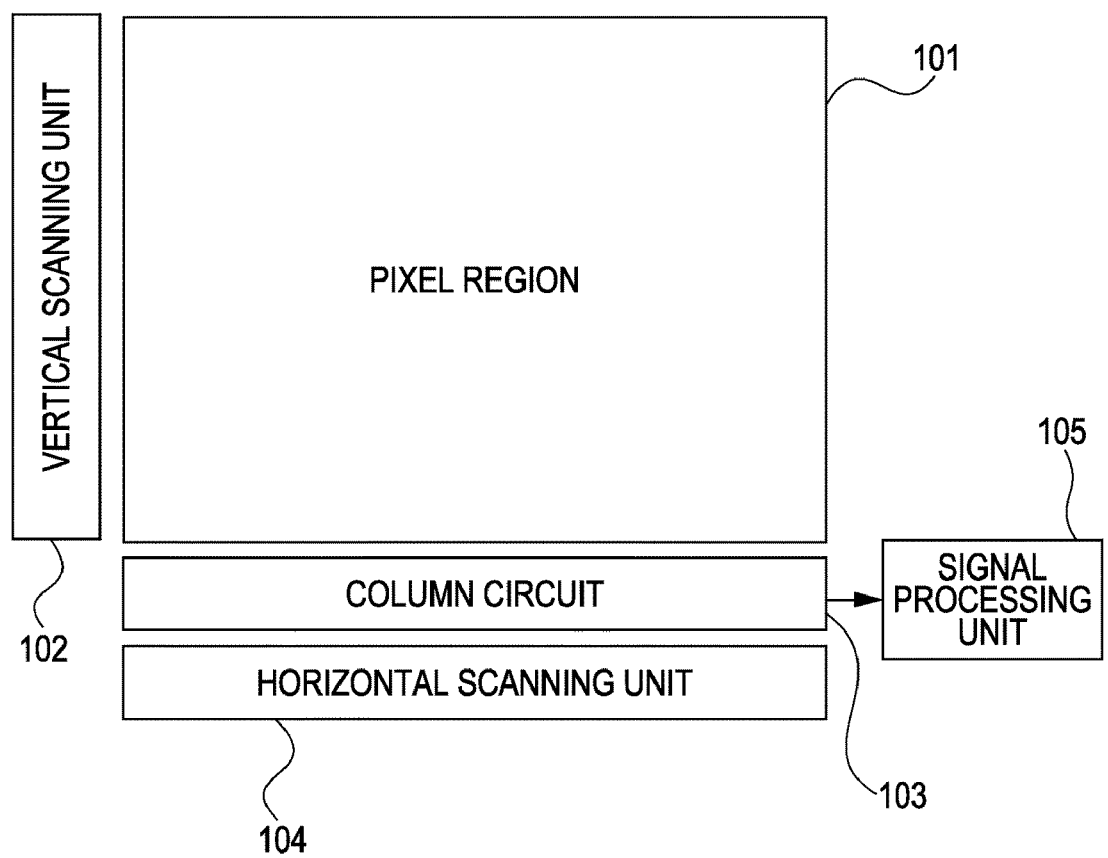
FIG. 1 is a block diagram of a solid-state image pickup apparatus.

Referring to FIG. 1, a pixel region 101 has a plurality of pixels arranged in a matrix form. A vertical scanning unit 102 is a circuit for use in scanning pixels in the pixel region row by row or rows by rows. The vertical scanning unit 102 can be constructed using a shift register or a decoder.

A column circuit 103 can also function as a readout circuit. The column circuit 103 performs predetermined processing on a signal read out from the pixel region 101 by a scan executed by the vertical scanning unit 102. The column circuit 103 can include, for example, a CDS circuit that suppresses noise of a pixel, an amplification unit that amplifies a signal from a pixel, and an analog-to-digital (A/D) converter that converts analog signals from a pixel into digital signals.

A horizontal scanning circuit 104 sequentially scans pixels column by column or columns by columns to read out a signal subjected to predetermined processing by the column circuit 103. The horizontal scanning circuit 104 can be constructed using a shift register or a decoder, similar to the vertical scanning unit 102.

A signal processing unit 105 performs predetermined processing on a signal output from the solid-state image pickup apparatus.

Although being omitted in FIG. 1, wiring for transmitting an optical signal or a driving signal exists between elements.

Figure 2:
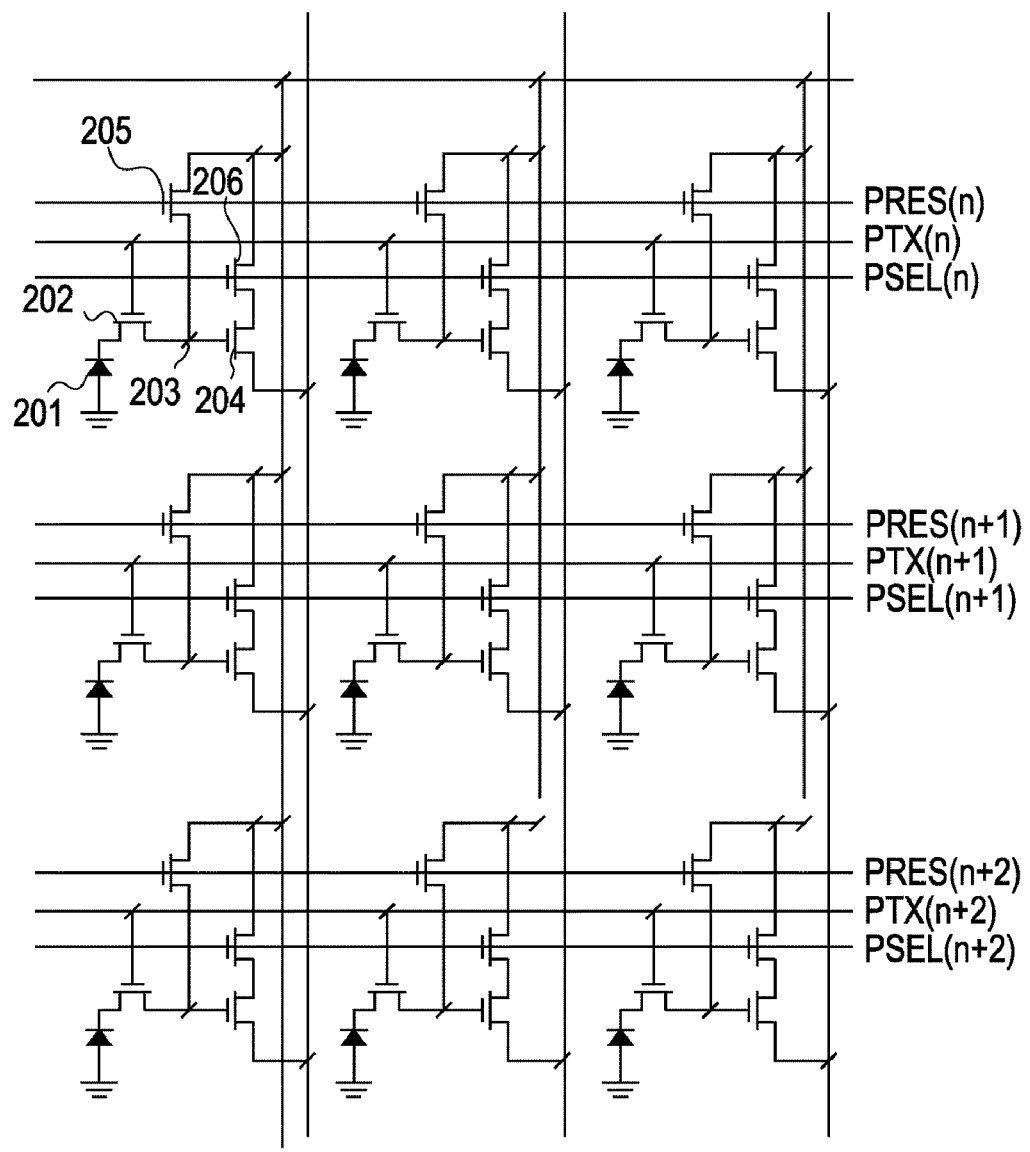
FIG. 2 is an equivalent circuit diagram of pixels of the solid-state image pickup apparatus.

FIG. 2 is an equivalent circuit diagram of pixels arranged in the pixel region. For the sake of clarity, the number of pixels contained in the pixel region 101 is 9 consisting of 3 rows by 3 columns. However, the number of pixels is not limited to 9, so more than 9 pixels may be arranged.

A photodiode 201 functions as a photoelectric conversion unit and photoelectrically converts incoming light to generate signal charges. A transfer transistor 202 functions as a transfer unit and transfers charges generated by the photoelectric conversion unit to an amplification unit, which will be described below. A floating diffusion (FD) region 203 functions as a part of an input section of the amplification unit, and charges generated by the photoelectric conversion unit are transferred to the FD region 203. Other elements constituting the input section of the amplification unit can be a gate of an amplification transistor, which will be described below, and a conductor that electrically connects the FD region and the gate of the amplification transistor.

An amplification transistor 204 functions as an amplification unit. The amplification transistor 204 and a constant-current supply (not shown) constitute a source follower circuit. The gate of the amplification transistor is electrically connected to the FD region. A reset transistor 205 functions as a reset unit. The reset transistor includes a source connected to the FD region and the gate of the amplification transistor and a drain to which a reset voltage is supplied. A selection transistor 206 functions as a selection unit. The selection transistor controls operations of the amplification unit to select a pixel. The selection unit can also be used as the resent unit and can control selection and non-selection of a pixel using a voltage supplied to the gate of the amplification transistor.

A transfer driving line PTX is used in supplying a pulse for controlling conduction and non-conduction of the transfer transistor. A reset driving line PRES is used in supplying a pulse for controlling conduction and non-conduction of the reset transistor. A selection driving line PSEL is used in supplying a pulse for controlling conduction and non-conduction of the selection transistor. Driving pulses are supplied to these driving lines from the vertical scanning unit. That is, the vertical scanning unit can function as a scanning unit for the transfer transistor and can supply a pulse to the gate of the transfer transistor.

In FIG. 2, the reset unit, the amplification unit, and the selection unit are disposed in each pixel. However, they can be shared by a plurality of photoelectric conversion units. A charge storing unit may be disposed between each of the photoelectric conversion units and the FD region. In this case, the configuration includes a first transfer unit that transfers a charge from the photoelectric conversion unit to the charge storing unit and a second transfer unit that transfers a charge from the charge storing unit to the FD region. In this case, an intermediate-level pulse, which will be described below, may be supplied to either the first transfer unit or the second transfer unit.

Specific configurations and driving methods are described below.

Figure 3:
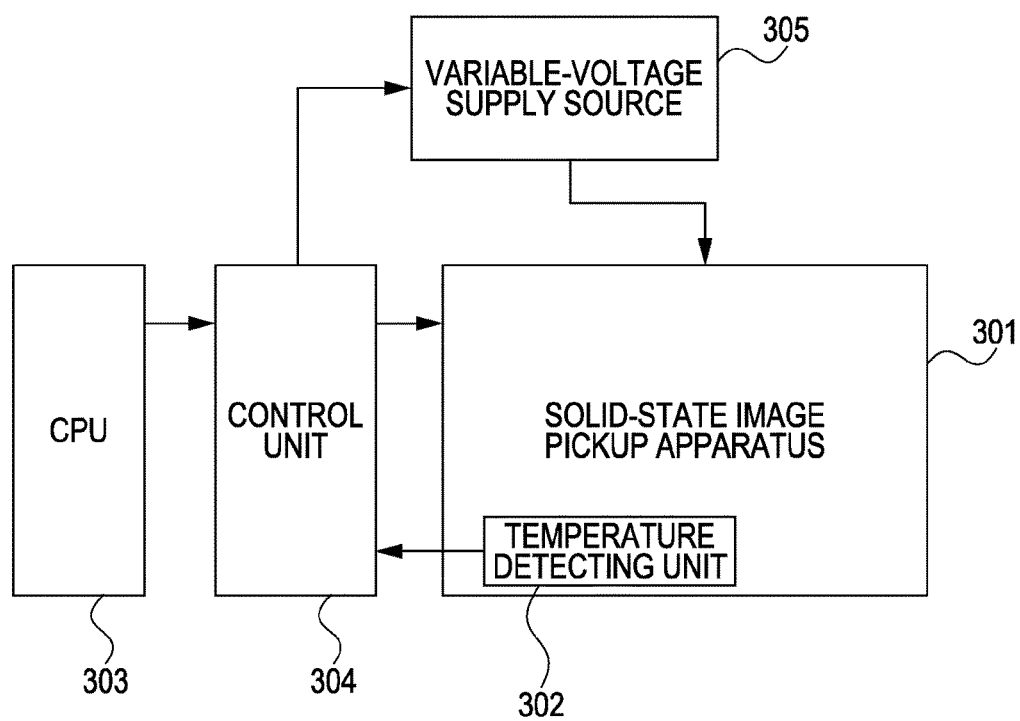
FIG. 3 is a block diagram of an image pickup apparatus according to a first embodiment of the present invention.

FIG. 3 is a block diagram of an image pickup apparatus according to a first embodiment of the present invention.

A temperature detecting unit 302 measures a temperature in or near a solid-state image pickup apparatus 301. For example, a diode can be used in the temperature detecting unit 302. The temperature detecting unit 302 disposed within the solid-state image pickup apparatus may also be arranged in an outside position at which the temperature near the solid-state image pickup apparatus can be measured. A control unit 304 controls the solid-state image pickup apparatus in response to information on the temperature from the temperature detecting unit 302 and a control signal from a central processing unit (CPU) 303. A variable-voltage supply source 305 supplies a voltage corresponding to the temperature to the solid-state image pickup apparatus in response to a control signal from the control unit 304. Supplying this voltage to the vertical scanning unit illustrated in FIG. 1 can vary a peak value of an intermediate-level pulse in accordance with the temperature. Alternatively, the pulse width of an intermediate-level pulse may be varied.

An operation flow according to the present embodiment is described below. First, signal charges are accumulated in the photoelectric conversion unit. After the completion of a predetermined exposure period, the accumulation is completed. After that, the temperature of the solid-state image pickup apparatus itself or near the solid-state image pickup apparatus is acquired by the temperature detecting unit. A lookup table that records voltage information corresponding to the acquired temperature information is accessed, and control is performed such that a voltage corresponding to the temperature is supplied from the variable-voltage supply source. After that, a readout operation is executed, as described below.

The energy that signal charges have varies depending on the temperature. If a potential barrier in a charge path between the photoelectric conversion unit and the FD region does not vary even when the temperature varies, the number of charges transferred to the FD region is different. In contrast, in the present embodiment, the temperature detecting unit is provided, and, in response to a signal from the temperature detecting unit, at least one of a peak value of a pulse supplied to the transfer transistor and a pulse width thereof is varied or switched. Specifically, if the temperature rises, the number of charges is increased even with the same pulse peak value. Accordingly, in order to achieve a constant quantity of transferred charges, irrespective of temperature, it is useful to make the pulse peak value smaller or the pulse width narrower for a high temperature and make the pulse peak value larger or the pulse width wider for a low temperature.

Figure 4:
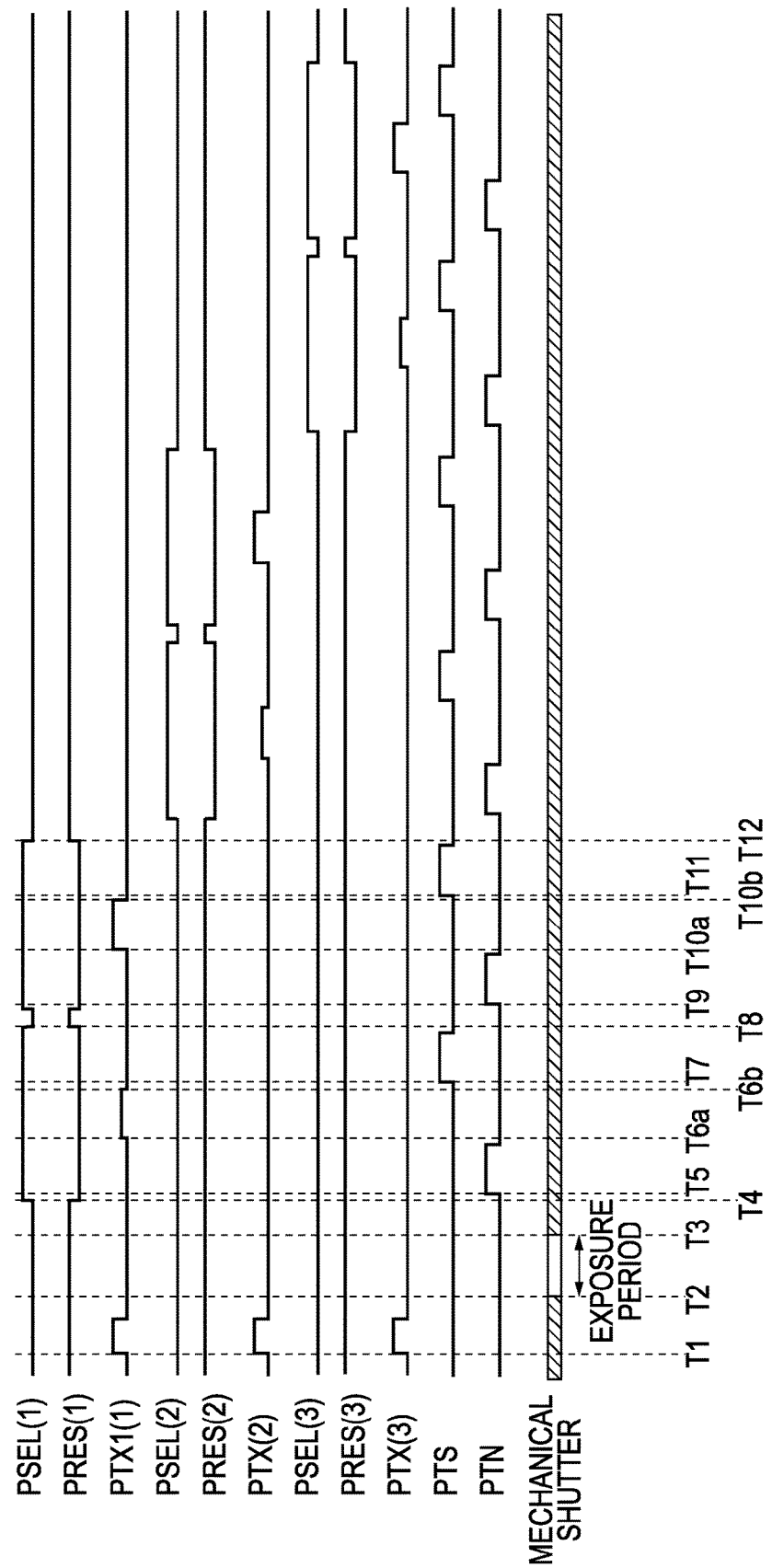
FIG. 4 illustrates driving pulses according to the first embodiment.
Figure 5:
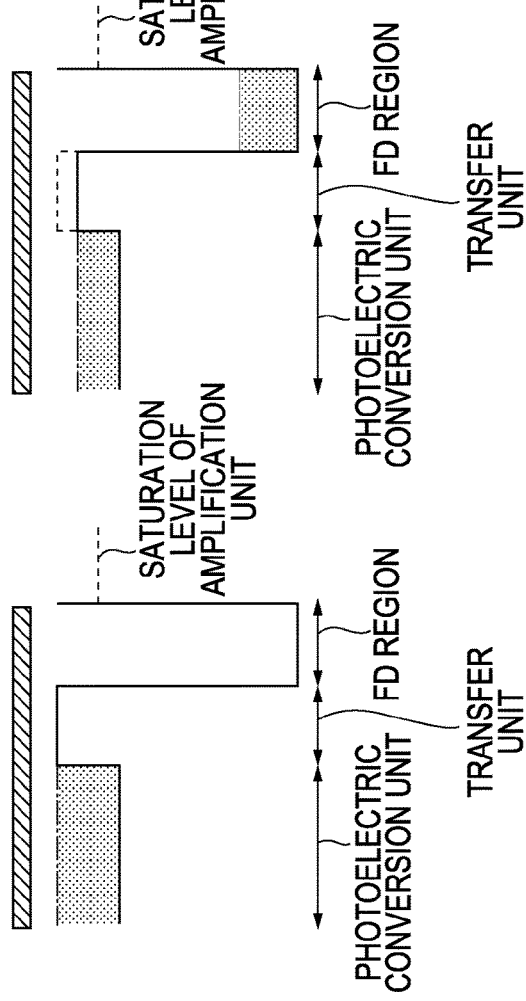
FIGS. 5A to 5C illustrate potentials according to the first embodiment.

Driving pulses in the present embodiment are illustrated in FIG. 4. Potential statuses in elements are illustrated in FIG. 5. In FIG. 4, PTX indicates a pulse supplied to the gate of the transfer transistor; PRES indicates a pulse supplied to the gate of the reset transistor; PSEL indicates a pulse supplied to the gate of the selection transistor. The figures in parentheses indicate pixel row numbers. The solid-state image pickup apparatus according to the present embodiment has a mechanical shutter. When the mechanical shutter is in an open state, light enters the photoelectric conversion unit; when the mechanical shutter is in a closed state, no light enters the photoelectric conversion unit. The mechanical shutter can specify an exposure period. In FIG. 4, for the mechanical shutter, the hatched section indicates the closed state, and the blank section indicates the open state.

PTS indicates a sampling pulse used in capturing a signal into an optical signal storing unit contained in the column circuit; PTN indicates a sampling pulse used in capturing a signal into a noise-signal storing unit contained in the column circuit. Noise signals can be pixel offsets of the reset transistor and the amplification transistor, random noise, or, if the column circuit includes the amplification unit, offsets of this column amplification unit.

In response to a high-level pulse, the transistors become conductive or perform sampling. Therefore, a high-level pulse can also be called a conductive pulse. In contrast, a low-level pulse can also be called a non-conductive pulse.

First, at T1, the reset transistor in a conductive state supplies a high-level pulse to PTX, and charges in the photoelectric conversion unit are reset. At this time, the mechanical shutter is in a closed state.

At T2, the mechanical shutter is brought into an open state, thus causing light to enter the photoelectric conversion unit. At this time, a pulse supplied to each of the transfer transistors is a low-level pulse that makes the transfer transistor non-conductive.

At T3, the mechanical shutter is brought into a closed state. This ends a period for which the photoelectric conversion unit generates signal charges.

At T4, a low-level pulse is supplied to PRES in the first pixel row, and a high-level pulse is supplied to PSEL. Here, the pulses are supplied simultaneously. However, they can be supplied at different times. To suppress kTC noise in the resent unit, at least in a period for which a high-level pulse is supplied to PTN that samples a noise signal, a low-level pulse is supplied to PRES.

At T5, a high-level pulse is supplied to PTN, and a noise signal in the first pixel row is stored in the column circuit.

At T6a, an intermediate-level pulse between a high-level pulse and a low-level pulse is supplied to PTX in the first pixel row. Only charges that exceed a potential barrier produced by the supply of the intermediate-level pulse in the photoelectric conversion unit are transferred to the FD region (first step). As is clear from the drawing, the first step is performed during the light shielding period, where the mechanical shutter shields the photoelectric conversion unit from light.

At T6b, a low-level pulse is supplied to PTX in the first pixel row.

At T7, a high-level pulse is supplied to PTS, and a signal based on a charge transferred in response to the supply of the intermediate-level pulse to the transfer transistor in the first pixel row is stored in the column circuit.

At T8, a low-level pulse is supplied to PSEL in the first pixel row, and a high-level pulse is supplied to PRES in the first pixel row. This operation resets charges transferred to the FD region in the first step.

At T9, a high-level pulse is supplied to PTN, and a noise signal in the first pixel row is stored in the column circuit.

At T10a, a high-level pulse is supplied to PTX in the first pixel row (second step). It is useful that a pulse having a peak value sufficient for fully transferring charges in the photoelectric conversion unit to the FD region be supplied. As is clear from the drawing, the second step is performed during the light shielding period, where the mechanical shutter shields the photoelectric conversion unit from light.

At T10b, a low-level pulse is supplied to PTX in the first pixel row.

At T11, a high-level pulse is supplied to PTS, and a signal based on charges transferred in the second step in the first pixel row is stored in the column circuit.

At T12, a low-level pulse is supplied to PSEL in the first pixel row, and a high-level pulse is supplied to PRES.

A signal obtained by the supply of a high-level pulse to the transfer transistor (second step) and a signal obtained by the supply of an intermediate-level pulse to the transfer transistor (first step) are added in the signal processing unit 105, which functions as an image signal generating unit. This enables most of charges caused by the photoelectric conversion unit to be handled as signals for use in image formation, irrespective of the dynamic range of the readout circuit disposed downstream of the photoelectric conversion unit.

The operations from T4 to T12 are repeated for each pixel row, thus reading out signals for one frame.

In the present embodiment, a transfer using an intermediate-level pulse at T6a to T6b (first step) is performed only once. However, it can be performed a plurality of times.

Next, a potential status at a time illustrated in FIG. 4 is described with reference to FIGS. 5A to 5C. In the illustrated potential statuses, the hatched sections indicate a state in which the mechanical shutter shields the photoelectric conversion unit from light.

FIG. 5A illustrates a potential status when a low-level pulse causing a non-conductive state is supplied to the transfer transistor. In this status, the mechanical shutter is in an open state, an exposure period has been completed, and signal charges are stored in the photoelectric conversion unit. That potential status exists in the periods T3 to T6a, T6b to T10a, and T10b to T12 in the first pixel row in FIG. 4. In the other pixel rows, the potential status illustrated in FIG. 5A exists in the period T3 to T12. In that status, a potential barrier sufficient for blocking signal charges stored in the photoelectric conversion unit from flowing into the FD region is present in a charge path between the photoelectric conversion unit and the FD region.

FIG. 5B illustrates a status in which an intermediate-level pulse is supplied to the transfer transistor. That status corresponds to the period T6a to T6b in FIG. 4. In this period, the potential barrier in the charge path between the photoelectric conversion unit and the FD region is also in an intermediate potential status between a conductive state and a non-conductive state. In that potential status, only signal charges that exceed the intermediate potential barrier of the signal charges stored in the photoelectric conversion unit are transferred to the FD region. The saturation level of the amplification unit indicates the maximum number of charges when the source follower of a pixel or the downstream readout circuit is not saturated.

FIG. 5C illustrates a status in which a high-level pulse is supplied to the transfer transistor. In this status, the potential barrier between the photoelectric conversion unit and the FD region is low sufficiently to allow signal charges in the photoelectric conversion unit to be transferred to the FD region. It is useful that a pulse having a peak value that allows signal charges in the photoelectric conversion unit to be fully transferred to the FD region be supplied. This can easily be determined from the relationship between the potential in the photoelectric conversion unit and the potential in the FD region during the transfer.

Here, a peak value of an intermediate-level pulse is described. Generally, it is useful that all the signal charges produced in the photoelectric conversion unit be used in image formation. However, if the capacity of the photoelectric conversion unit is large and the saturation charge quantity is also large, even when many signal charges are produced in the photoelectric conversion unit, the dynamic range may be limited by the saturation of the downstream readout circuit. Examples of the readout circuit having such limitations include a source follower circuit of a pixel, a column amplification unit disposed in the column circuit, and an A/D conversion unit. Here, the dynamic range of the source follower circuit being the pixel amplification unit is described as one example. When the amplification unit forms the source follower circuit using the amplification transistor and the constant-current supply, if many signal charges are transferred from the photoelectric conversion unit to the FD region, a decrease in the potential in the FD region is also large. Because the FD region is electrically connected to the gate of the amplification transistor, if the decrease in the potential in the FD region makes the difference between the gate potential and the source potential of the amplification transistor lower than a threshold voltage (Vth), a source follower operation is inactive. If so, a signal cannot be read out. Even when charges fewer than the dynamic range of the source follower circuit are read out, if a high gain is provided in the column amplification unit, the saturation of the readout circuit is determined by the limitation on the input dynamic range of the column amplification unit.

Accordingly, the peak value of the intermediate-level pulse can be set at a value at which charges not exceeding the dynamic range of the readout circuit can be transferred. When predetermined processing is performed in each readout circuit every time a readout is executed, even if the saturation charge quantity of the photoelectric conversion unit is so large that it exceeds the dynamic range of the readout circuit, all signal charges produced in the photoelectric conversion unit can be read out. Because such an operation is performed after an exposure period is completed in the photoelectric conversion unit, i.e., during a light shielding period of the photoelectric conversion unit, charges accumulated in the photoelectric conversion unit do not increase, so all signal charges accumulated in the photoelectric conversion unit can be transferred. Additionally, because the peak value of an intermediate-level pulse is varied with the temperature, signal charges in the photoelectric conversion unit can be read out while adverse effects of temperature changes are suppressed.

The present embodiment is particularly effective when the combination of the dynamic range of the photoelectric conversion unit and that of the charge storing unit is larger than the dynamic range of the readout circuit disposed downstream of the photoelectric conversion unit.

With the present embodiment, even when the temperature changes in the solid-state image pickup apparatus or in the vicinity thereof, a readout is executable without limitations imposed on the dynamic range of the readout circuit disposed downstream of the photoelectric conversion unit.

A second embodiment is an example in which an intermediate-level pulse described in the first embodiment is varied in accordance with the gain of the readout circuit disposed downstream of the photoelectric conversion unit. Here, examples of the readout circuit disposed downstream of the photoelectric conversion unit include an amplification unit disposed in a pixel, a column amplification unit disposed in the column circuit, and an output amplification unit used to output a series signal into which a parallel signal from the column circuit is converted to the outside.

Figure 6:
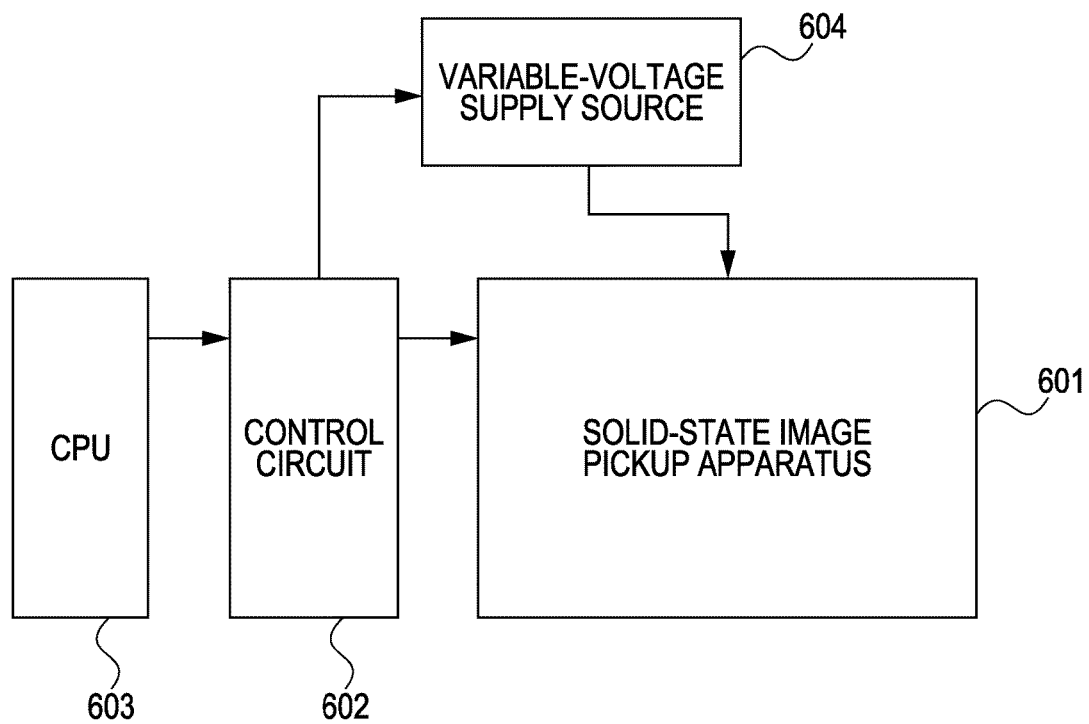
FIG. 6 is a block diagram of an image pickup apparatus according to a second embodiment of the present invention.

FIG. 6 is a block diagram of an image pickup apparatus including a solid-state image pickup apparatus according to the present embodiment.

Reference numeral 601 represents a solid-state image pickup apparatus. Reference numeral 602 represents a control circuit. Reference numeral 603 represents a CPU. Reference numeral 604 represents a variable-voltage supply source. The gain of an amplification circuit contained in the readout circuit disposed downstream of the photoelectric conversion unit is set by the control circuit 602 and the CPU 603. The gain can be controlled in response to, for example, sensitivity switching or a readout-speed change.

An operation flow according to the present embodiment is described below. First, signal charges are accumulated in the photoelectric conversion unit. After a predetermined exposure period is completed, the accumulation is completed. After that, a lookup table that records voltage information corresponding to the gain of the amplification circuit contained in the readout circuit disposed downstream of the photoelectric conversion unit is accessed, and control is performed such that a voltage corresponding to the gain is supplied from the variable-voltage supply source. After that, the above-described readout operation is executed. Additionally, a temperature detecting unit may be provided for correction with the temperature, as described in the first embodiment. That is, the peak value or the pulse width of an intermediate-level pulse may be determined from both the gain of the amplification circuit and the ambient temperature.

Changes in the peak value or the supply time of an intermediate-level pulse when the gain of the readout circuit is variable are described below with reference to FIGS. 7A to 7H.

FIG. 7A illustrates a dependence of an output voltage on the incident light quantity (photoelectric conversion characteristic) when a first intermediate-level pulse is supplied. FIG. 7B illustrates a photoelectric conversion characteristic when a second intermediate-level pulse is supplied. FIG. 7C illustrates a photoelectric conversion characteristic when a high-level pulse is supplied. FIG. 7D illustrates an output signal characteristic after addition after charges are transferred to the FD region in response to each readout pulse. FIGS. 7E to 7G illustrate photoelectric conversion characteristics and FIG. 7H illustrates an output signal characteristic when the peak value of a pulse is varied in accordance with the gain of the readout circuit. Specifically, FIGS. 7E to 7H illustrate an example in which, when the gain of the readout circuit is changed from a first gain to a second gain higher than the first gain, the peak value of a pulse is reduced from that illustrated in FIGS. 7A to 7C.

When the gain of the readout circuit is variable, the incident light quantity up to saturation of the circuit (saturation light quantity) differs from gain to gain of the readout circuit. The light quantities 904a, 904b, and 904c represent ones occurring when the gain of the readout circuit is low. The light quantities 906a, 906b, and 906c represent ones occurring when the gain of the readout circuit is high. When the gain of the readout circuit is low, the saturation light quantity is high, as indicated at 905a, 905b, and 905c. Accordingly, all of the signal charges transferred to the FD region can be used as signals for use in image formation. However, when the gain of the readout circuit is high, the saturation light quantity is low, as indicated at 907a, 907b, and 907c. Accordingly, a part of the signal charges transferred to the FD region exceeds the input dynamic range of the readout circuit, and this means that a part of information is absent. As a result, as illustrated in FIG. 7D, a photoelectric conversion characteristic obtained after signals in regions A, B, and C illustrated in FIGS. 7A to 7C are combined is stepped, as indicated at 909. That is, the obtained photoelectric conversion characteristic undesirably has a deadband. For reference, when there is no absence, a linear characteristic is obtainable, as indicated at 908.

In such a case, as illustrated in FIGS. 7E to 7G, the peak value of an intermediate-level pulse can be limited to a level lower than that illustrated in FIGS. 7A to 7C. Alternatively, the pulse supply time can be shortened to restrict transient movement of charges and reduce the number of charges transferred when an intermediate-level pulse is used. Therefore, even when pulses are supplied and read out three times, similar to the case illustrated in FIGS. 7A to 7C, the photoelectric conversion characteristics illustrated in FIGS. 7E to 7G are obtainable. The photoelectric conversion characteristic obtained after these signals are combined is illustrated in FIG. 7H. In FIG. 7H, there is no absence in information, unlike FIG. 7D, so no undesired deadband is present after the signals in the regions A, B, and C are combined.

Because the number of charges that can be read out at a time is limited, the saturation light quantity after combination is reduced. The reduction in saturation light quantity can be suppressed by an increase in the number of times in response to an intermediate-level pulse and the peak value of a supplied intermediate-level pulse as needed.

With the present embodiment, even when the gain of the readout circuit disposed downstream of the photoelectric conversion unit changes, signals having photoelectric conversion characteristics being continuous even after combination are obtainable without the occurrence of deadbands.

A feature of a third embodiment is that the gain of the amplification circuit contained in the readout circuit is switched for each signal read out in response to each of a high-level pulse causing the transfer transistor conductive and an intermediate-level pulse (may be a plurality of pulses). An increase in the gain of the readout circuit raises the signal-to-noise ratio (S/N), and as a result, enables high-sensitive image capture of a subject in low-light conditions. If the gain of the amplification circuit is set high when a signal is read out in response to an intermediate-level pulse, the number of signal charges that can be read out at a time is reduced. To read out charges in the photoelectric conversion unit as many as possible, an intermediate-level pulse is supplied more times. In addition, when the amplification circuit has a high gain, the readout speed is often reduced.

To address this, the gain with respect to a signal read out in response to the supply of a high-level pulse that cause the transfer transistor conductive is set higher than the gain with respect to a signal read out in response to the supply of an intermediate-level pulse.

Figure 8A:
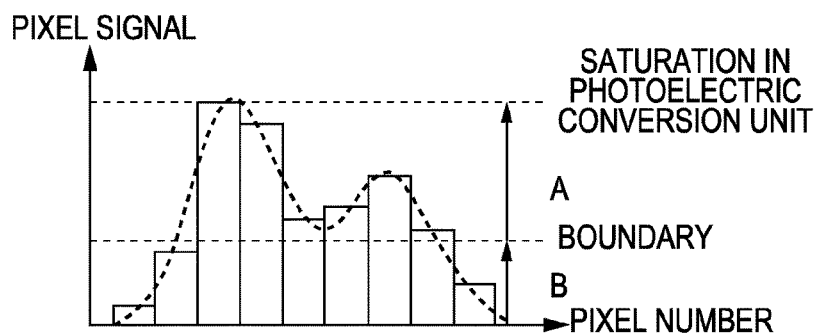
FIGS. 8A to 8E illustrate distributions of pixel signals according to a third embodiment of the present invention.

FIGS. 8A to 8E illustrate relationships between pixel signals of pixels and noise according to the present embodiment. FIG. 8A illustrates a distribution of charges occurring in the photoelectric conversion unit of each of the pixels in response to incident light. In FIG. 8A, the saturation in the photoelectric conversion unit and the boundary between charges transferred in response to an intermediate-level pulse and charges transferred in response to a high-level pulse are indicated by the dotted lines. The saturation charge number in the photoelectric conversion unit can be 100,000e$^-$, for example. The quantity of charges transferred in response to an intermediate-level pulse can be 90,000e$^-$, for example. The quantity of charges transferred in response to a high-level pulse can be 10,000e$^-$, for example.

Figure 8B:
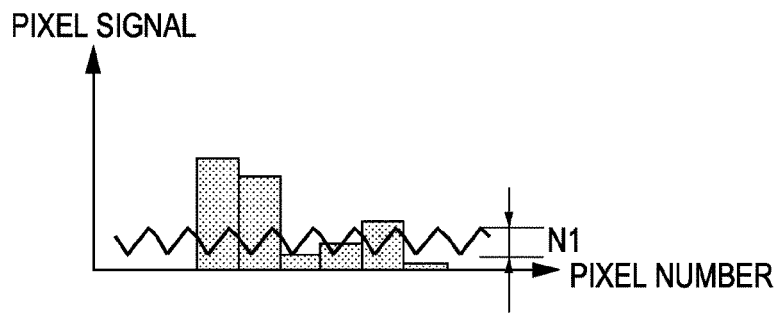

FIG. 8B illustrates a portion A extracted from FIG. 8A. The extracted portion relates to signal charges transferred in response to an intermediate-level pulse. The random noise in the step of transferring charges in response to an intermediate-level pulse can be represented as $V_{RN1}$(mVrms).

Figure 8C:
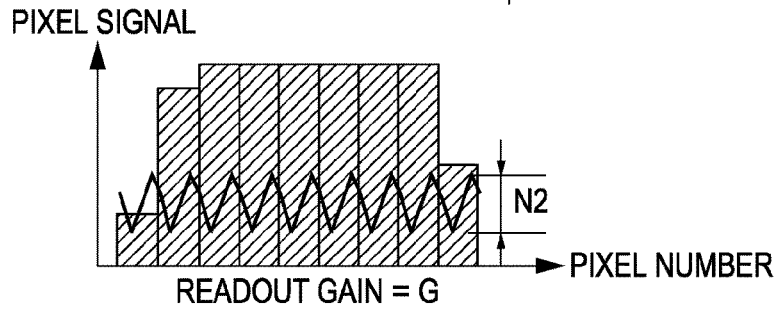

FIG. 8C illustrates a portion B extracted from FIG. 8A. The extracted portion relates to signal charges transferred in response to a high-level pulse. Here, the gain at the downstream part is G. In this case, the random noise can be represented as $V_{RN2}$ (mVrms).

Figure 8D:
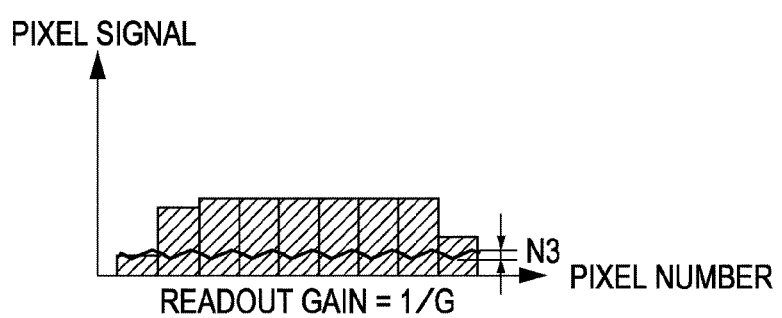

FIG. 8D illustrates the portion B extracted from FIG. 8A. The extracted portion relates to signal charges transferred in response to a high-level pulse. Here, the gain at the downstream readout circuit is 1/G. That is, the gain is lower than that in FIG. 8C. In this case, the random noise can be represented as $V_{RN2}/G$(mVrms).

Figure 8E:
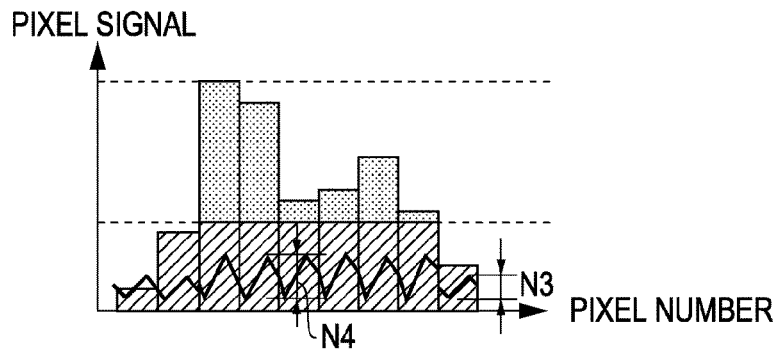

FIG. 8E illustrates a combined condition. The random noise can be $((V_{RN1})^2+(V_{RN2}/G)^2)^{0.5}$, and a readout with low noise is possible.

Figure 9:
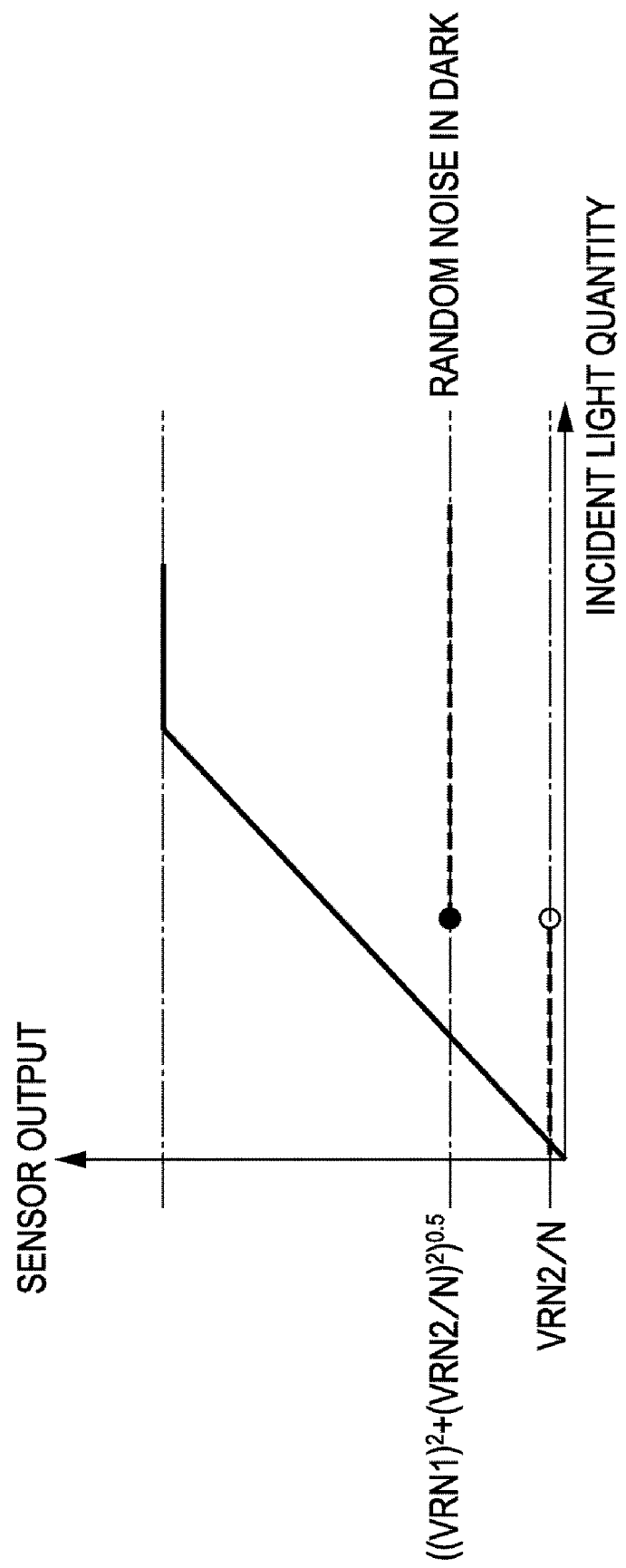
FIG. 9 illustrates a relationship between a pixel signal and noise according to the third embodiment.

FIG. 9 illustrates a relationship between an incident light quantity and an output (i.e., sensor output) from the solid-state image pickup apparatus.

As described above, in addition to the features obtained in other embodiments, the improving S/N of the sensor without sacrificing the readout speed is obtainable.

A fourth embodiment differs from other embodiments in that it is possible to switch between addition and non-addition of a signal obtained in the state where a high-level pulse causing the transfer transistor conductive is supplied to a signal obtained in response to an intermediate-level pulse.

Figures 10A, 10B, 10C, 10D:
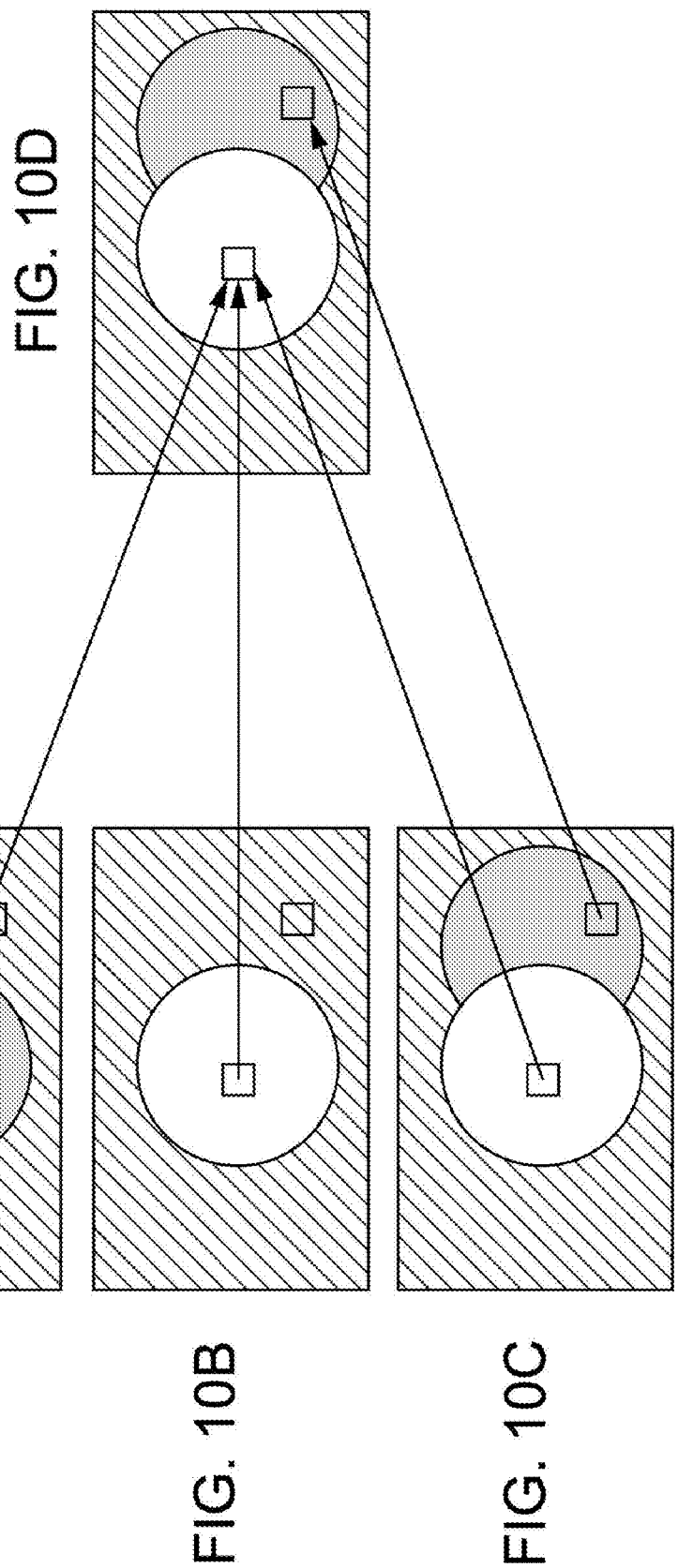
FIGS. 10A to 10D illustrate how signal processing is performed according to a fourth embodiment of the present invention.

The non-execution of an addition of the above-described signal obtained in response to the supply of a high-level pulse if a threshold is not exceeded can prevent addition of random noise. The details are described below with reference to FIGS. 10A to 10D. FIG. 10A illustrates a signal obtained when signal charges are transferred to the FD region in response to a first intermediate-level pulse. FIG. 10B illustrates a signal obtained when signal charges are transferred to the FD region in response to a second intermediate-level pulse. FIG. 10C illustrates a signal obtained when signal charges are transferred to the FD region in response to a conductive pulse. FIG. 10D illustrates an image obtained after signals are combined.

In FIGS. 10A and 10B, most of the signals indicated by the squares in the hatched region have a random noise component. If addition is performed, S/N is degraded. In contrast, in FIG. 10C, as indicated in the shaded region, the signals are at a level where they are to be used as signals for use in image formation. For example, for a subject in low-light conditions, signal charges are accumulated (e.g., in an accumulation unit) in only the photoelectric conversion unit without exceeding the potential barrier produced by an intermediate-level pulse. Accordingly, if a transfer operation using an intermediate-level pulse is performed in such a state, the noise is simply increased.

To address this, if a signal based on charges transferred in response to an intermediate-level pulse does not exceed a predetermined threshold, the signal obtained when the transfer is performed using the intermediate-level pulse may not be used as signals for use in image formation. Alternatively, if a signal obtained when the transfer is performed using a conductive pulse is not smaller than a predetermined threshold, it may be determined that there is a signal from the charge storing unit, and the signal may be used as a signal for use in image formation. Additionally, a unit configured to monitor the incident light quantity for each pixel may be provided, and a case where the signal is used in image formation and a case where the signal is not used in image formation may be switched depending on the incident light quantity to the pixel.

Figure 11:
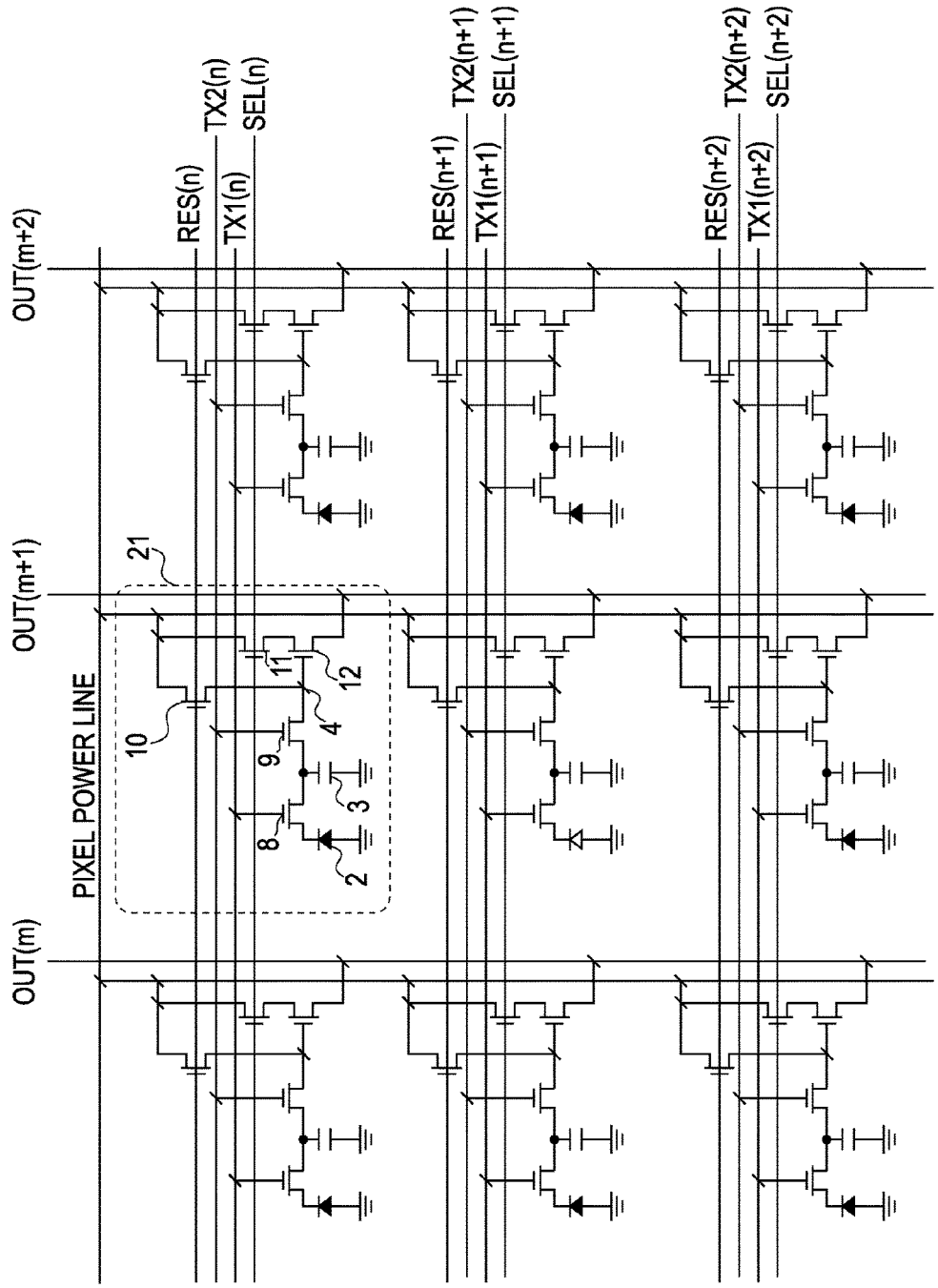
FIG. 11 is an equivalent circuit diagram of a solid-state image pickup apparatus according to a fifth embodiment of the present invention.

FIG. 11 is an equivalent circuit diagram of pixels arranged in the pixel region according to a fifth embodiment. For the sake of clarity, the number of pixels contained in the pixel region 101 is 9 consisting of 3 rows by 3 columns. However, the number of pixels is not limited to 9. In a pixel 21, a photodiode (PD) 2 functions as the photoelectric conversion unit. The PD 2 has an anode connected to a fixed potential (for example, the ground) and a cathode connected to a first terminal of a charge storing unit 3 through a first transfer transistor 8 functioning as a first transfer unit. The charge storing unit 3 has a second terminal connected to a fixed potential (for example, the ground). The first terminal of the charge storing unit 3 is connected to an FD region 4 through a second transfer transistor 9 functioning as a second transfer unit. The FD region 4 is connected to a gate terminal of an amplification transistor 12 functioning as a part of the amplification unit. The gate of the amplification transistor 12 functions as an input section of the amplification unit. The gate of the amplification transistor 12 is connected to a pixel power line through a reset transistor 10 functioning as the reset unit. Each of the transfer transistors can be a metal oxide semiconductor (MOS) transistor.

A selection transistor 11 functioning as the selection unit has a drain terminal, which is a first main electrode, connected to the pixel power line and a source terminal, which is a second main electrode, connected to the drain, which is a first electrode, of the amplification transistor 12. When an active signal SEL is input, both the main electrodes of the selection transistor become conductive. This cause the amplification transistor 12 to form the source follower circuit together with a constant-current supply (not shown) disposed in a vertical signal line OUT and causes a signal corresponding to a potential of the gate terminal being a control electrode of the amplification transistor 12 to appear in the vertical signal line OUT. A signal based on the signal appearing in the vertical signal line OUT is output from the solid-state image pickup apparatus, and it forms an image signal through the signal processing circuit.

In FIG. 11, the reset unit, the amplification unit, and the selection unit are provided in each pixel. However, they can be shared by a plurality of pixels. Alternatively, a configuration that does not have the selection unit and that can select a pixel using a potential of the input section of the amplification unit can be used.

The present invention is applicable to a configuration that includes the charge storing unit between the photoelectric conversion unit and the FD region, one example of such a configuration being described above.

It is particularly useful that the structure of the charge path between the photoelectric conversion unit and the charge storing unit use a configuration having the following features, i.e., a configuration in which charges can be transferred from the photoelectric conversion unit to the charge storing unit in a state where a low-level pulse causing the first transfer unit non-conductive.

A specific example configuration is the one in which, when the first transfer unit is a MOS transistor, the MOS transistor has a buried channel structure. In that configuration, the potential barrier has a lower portion in a location lower than the surface even in a non-conductive state, the lower portion existing in only that location. In this case, the charge transfer unit may also be in a state where a constant voltage is supplied without the performance of active control during the accumulation of signal charges. That is, a fixed potential barrier may also be provided without the function as the transfer unit. Immediately before the completion of the accumulation, control is performed such that the height of the potential barrier is reduced, and signal charges remaining in the photoelectric conversion unit are transferred to the charge storing unit.

With this configuration, it is possible to transfer substantially all of the signal charges produced by photoelectric conversion when light is incident on the photoelectric conversion unit to the charge storing unit without being accumulated in the photoelectric conversion unit. Accordingly, the photoelectric conversion units contained in all the pixels can have substantially the same time of accumulation of charges. When the MOS transistor is not conductive, holes are accumulated in the channel surface and a channel to which a charge is transferred is present in a portion lower than the surface by a predetermined depth. Accordingly, adverse effects of a dark current on the insulating film interface can be reduced.

From another point of view, in a period for which signal charges are accumulated in the photoelectric conversion unit and the charge storing unit, it can be said that the potential barrier in the charge path between the photoelectric conversion unit and the charge storing unit is lower than the potential barrier in the charge path between the photoelectric conversion unit and another region. The potential used here indicates the potential with respect to a signal charge. For example, when an OFD region is provided, that potential barrier can have a potential lower than the potential between the photoelectric conversion unit and the OFD region.

It is particularly useful that, in a period where signal charges are accumulated in the charge storing unit made of a charge-coupled device, charges having an opposite polarity to the signal charges be accumulated in the surface of the charge storing unit by application of a potential to the counter electrode through the insulating film to suppress generation of a dark current on the semiconductor surface on which the charge storing unit is disposed.

With this configuration, a dark current caused by the charge storing unit can be further reduced. At the same time, because it is not necessary to inject opposite conductivity type impurities for addressing a dark current into the surface of the charge storing unit, a portion that deals with charge storing can be formed in a shallower area adjacent to the surface than the photoelectric conversion unit (e.g., a photodiode). Accordingly, the ability to store charges per unit volume can be enhanced such that the ability to store charges can be several times as high as that of a traditional configuration in which a photodiode functions to store charges.

In terms of driving, in one signal charge generation period, a signal charge transferred from the photoelectric conversion unit to the charge storing unit is stored in the charge storing unit and is used as an image signal. That is, after the beginning of one signal charge generation period, a signal is read out to the outside of a pixel without a reset operation in the charge storing unit. One signal charge generation period is determined so as to be common to the photoelectric conversion units when one frame image is captured.

A specific configuration and driving method according to the present embodiment of the present invention are described below. A pixel configuration in this case is based on a configuration in which a pixel has a structure in which the first transfer unit is a buried channel MOS transistor and the charge storing unit is made of a charge coupled device. The description is provided using, as an example, a configuration in which a transistor is used as each of the first and second transfer units.

FIG. 12 illustrates a driving pulse according to the present embodiment. FIG. 13 illustrates a potential. The present embodiment is distinct in that how a signal charge generation period for one frame is determined. In contrast to the first embodiment, in which the mechanical shutter is used, the signal charge generation period is specified by the use of an electronic shutter in the present embodiment.

The driving pulse illustrated in FIG. 12 is described. Mainly, the description is provided while focusing on points different from the first embodiment.

First, at T1, a high-level pulse is supplied to each of the reset transistor and the first to third transistors, thus causing the transistors conductive. The charges in the photoelectric conversion unit, the charge storing unit, and the FD region are reset.

At T2, a low-level pulse is supplied to the third transfer transistor, and a signal charge generation period is started. When the mechanical shutter is not used, although light is incident on the photoelectric conversion unit, the OFD region and the photoelectric conversion unit are made non-conductive by the third transfer transistor and a state where the photoelectric conversion unit and the charge storing unit store charges is determined as the signal charge generation period. At this time, the pulse supplied to each of the first and second transfer transistors is a low-level pulse causing each of the transfer transistors non-conductive.

At T3a, a high-level pulse is supplied to the third transfer transistor, and the signal charge generation period is completed. That is, the state is the one in which signal charges produced in the photoelectric conversion unit are ejected to the OFD region. At the same time, an intermediate-level pulse between a high-level pulse and a low-level pulse is supplied to the second transfer transistor (first step). Only a part of the signal charges in the photoelectric conversion unit and the charge storing unit that exceeds a potential barrier in response to the supply of the intermediate-level pulse is supplied to the FD region.

At T3b, a low-level pulse causing a non-conductive state is supplied to the second transfer transistor.

At T4a, a high-level pulse causing a conductive state is supplied to the second transfer transistor (second step). It is useful that a pulse having a peak value at which signal charges in the charge storing unit can be fully transferred to the FD region be supplied. At this time, the first transfer transistor is in a state where a low-level pulse is supplied.

At T4b, a low-level pulse causing a non-conductive state is supplied to the second transfer transistor.

At T5a, a high-level pulse causing a conductive state is supplied to each of the first and second transfer transistors (third step).

At T5b, a low-level pulse causing a non-conductive state is supplied to each of the first and second transfer transistors.

The third transfer transistor is in a conductive state, and all of the signal charges in the photoelectric conversion unit have been ejected to the OFD region. Accordingly, the driving at T5a and T5b may not be performed.

After that, the signals obtained in the first to third steps are added in the signal processing unit 105. Most of the signal charges produced by photoelectric conversion in the photoelectric conversion unit can be handled as signals for use in image formation, irrespective of the dynamic range of the readout circuit disposed downstream of the photoelectric conversion unit and the charge storing unit.

Repeating the operations from T3a to T5b for each pixel row enables signals for one frame to be read out.

The transfer in response to an intermediate-level pulse (first step) at T3a to T3b is performed only once. However, the transfer may be performed a plurality of times.

In the present embodiment, the period for which the third transfer transistor is in a conductive state, that is, the period for which charges of the photoelectric conversion unit are ejected to the OFD region can be regarded as a light-shielding period. During this period, a high-level pulse and an intermediate-level pulse are supplied to the transfer transistor.

Next, a potential status at each time illustrated in FIG. 12 is described with reference to FIGS. 13A to 13E.

Figure 13A:
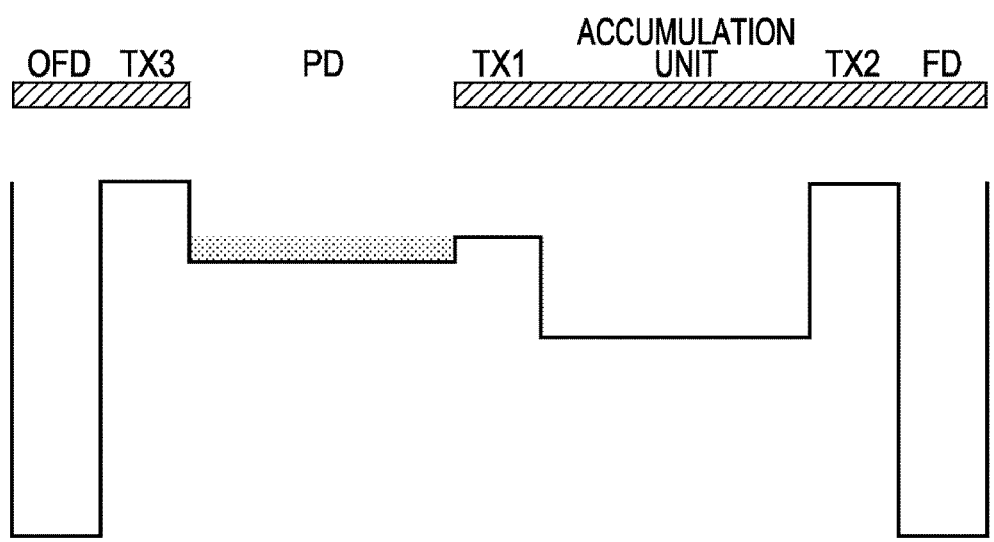
FIGS. 13A to 13E illustrate potentials according to the fifth embodiment.
Figure 13B:
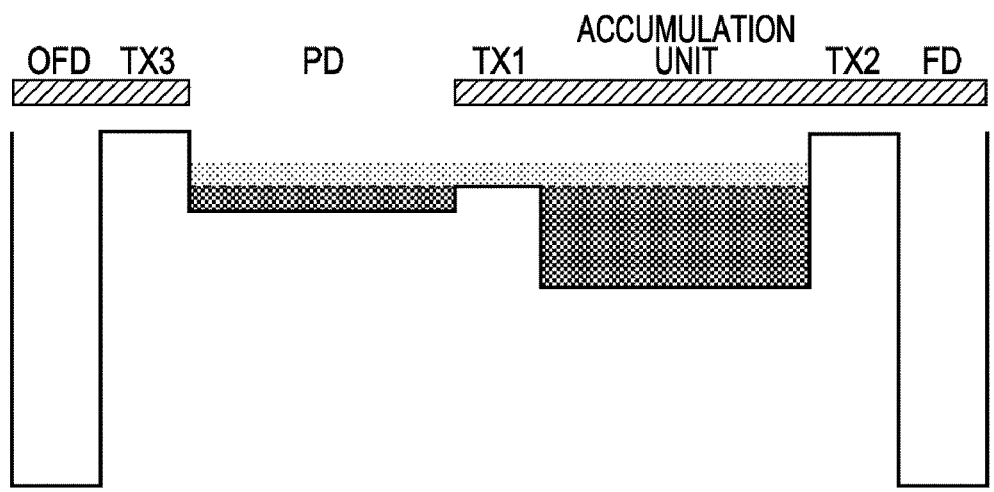

FIGS. 13A and 13B illustrate potential statuses at T2 to T3a illustrated in FIG. 12.

FIG. 13A illustrates a status in which a few quantity of light is incident. In this status, charges are stored in the photoelectric conversion unit without exceeding the potential barrier between the photoelectric conversion unit and the charge storing unit determined by the peak value of a pulse supplied to the first transfer transistor. Here, a low-level pulse is supplied to the first transfer transistor. The potential barrier is controlled so as to have a relatively low level such that signal charges produced in the photoelectric conversion unit are immediately moved to the charge storing unit. Such a status can be achieved by the use of a buried channel MOS transistor as the first transfer transistor, as described above.

FIG. 13B illustrates a status in which a part of signal charges produced in the photoelectric conversion unit exceeds the potential barrier determined by the first transfer transistor, the exceeding part of signal charges is moved to the charge storing unit, and the moved signal charges are stored also in the charge storing unit. The dotted line indicates the height of the potential barrier in a state where a low-level pulse is supplied to the first transfer transistor.

Figure 13C:
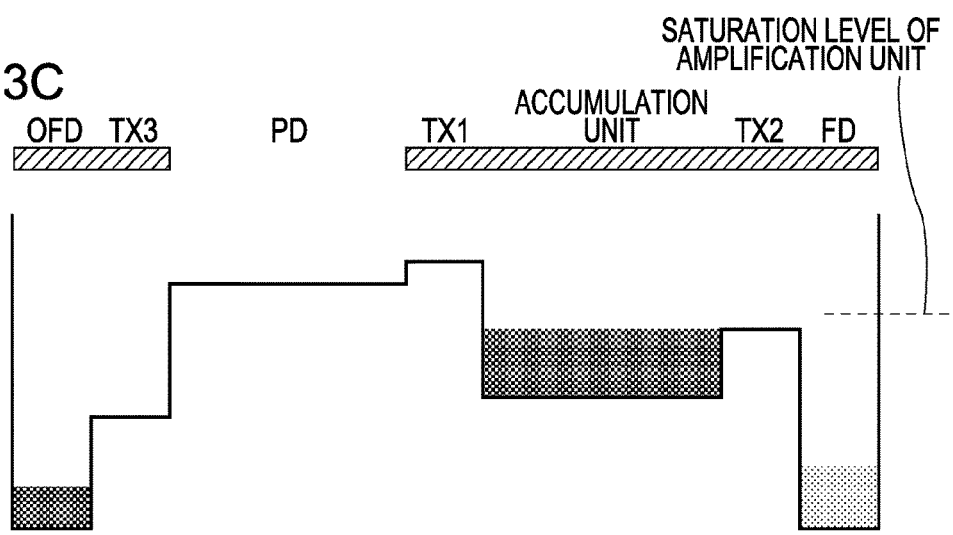

FIG. 13C illustrates a potential status at T3a to T3b illustrated in FIG. 12. In this potential status, a low-level pulse is supplied to the first transfer transistor and an intermediate-level pulse is supplied to the second transfer transistor (first step). Due to this operation, signal charges above the dotted line illustrated in FIG. 13B and a part of the signal charges accumulated in the charge storing unit are transferred to the FD region. Because the third transfer transistor is in a conductive state, the potential barrier between the photoelectric conversion unit and the OFD region is low and a signal charge produced in the photoelectric conversion unit after the transfer is transferred to the OFD region. That is, although a charge is produced in photoelectric conversion, it is ejected to the OFD region, so the period can be regarded as a period for which no signal charge is generated.

Figure 13D:
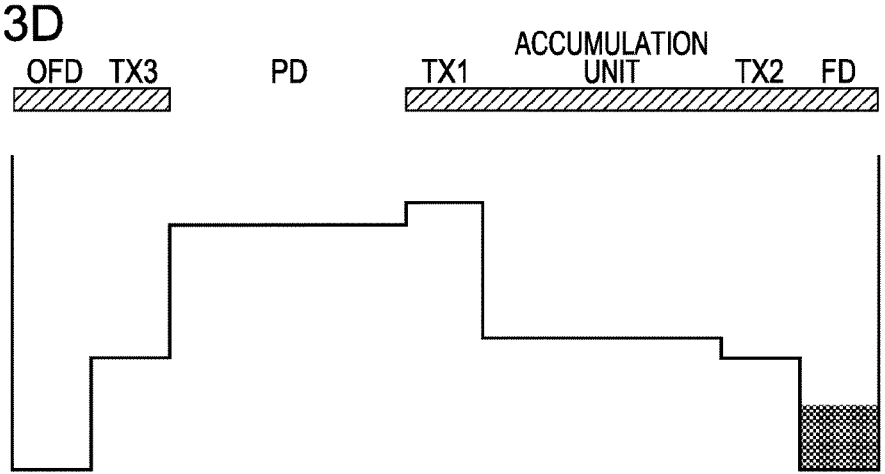

FIG. 13D illustrates a potential status at T4a to T4b illustrated in FIG. 12. In this state, a low-level pulse is supplied to the first transfer transistor and a high-level pulse is supplied to the second transfer transistor (second step). Due to this operation, a signal charge remaining after the signal charges stored in the charge storing unit are transferred in the second step is transferred to the FD region.

Figure 13E:
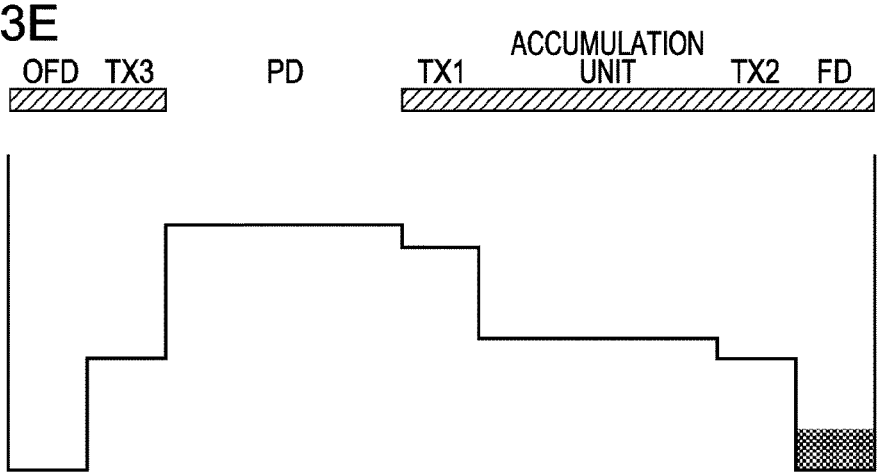

FIG. 13E illustrates a potential status at T5a to T5b illustrated in FIG. 12. In this state, a high-level pulse is supplied to each of the first to third transfer transistors (third step). As described above, the third step may be provided; it is not necessarily required.

With the present embodiment, although charges transferred to the FD region are slightly reduced, the dynamic range is extended and the configuration can be simple without the provision of a mechanical shutter. This is also useful for high-speed operation.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-262998 filed Oct. 9, 2008, which is hereby incorporated by reference herein in its entirety.

What is claimed is:

1. An apparatus comprising:
a plurality of pixels each having a photoelectric conversion unit and a transfer transistor that transfers a charge of the photoelectric conversion unit;
an amplification unit configured to receive the transferred charge;
a scanning unit configured to supply, to a gate of the transfer transistor, a conductive pulse, a non-conductive pulse, and an intermediate-level pulse having a peak value between the conductive pulse and the non-conductive pulse;
a generating unit configured to generate an image signal using a signal based on a charge transferred in response to the conductive pulse and the intermediate-level pulse;
a detecting unit configured to detect a temperature; and
a control unit configured to change at least one of a pulse width of the intermediate-level pulse and the peak value in accordance with information on the detected temperature,
wherein the conductive pulse and the intermediate-level pulse are supplied to the transfer transistor during a light shielding period of the photoelectric conversion unit.

2. The apparatus according to claim 1, wherein image signals for one frame are generated using signals based on charges transferred in response to the intermediate-level pulses supplied to the transfer transistor a plurality of times.

3. The apparatus according to claim 1, wherein a quantity of light incident on the photoelectric conversion unit is controlled by a mechanical shutter.

4. The apparatus according to claim 1, further comprising a readout circuit disposed downstream of the amplification unit, the readout circuit including an amplifier circuit having a variable gain,
wherein at least one of the pulse width of the intermediate-level pulse and the peak value is determined based on information on the detected temperature and the gain.

5. The apparatus according to claim 1, further comprising a readout circuit disposed downstream of the amplification unit, the readout circuit including an amplifier circuit having a variable gain,
wherein the gain with respect to a signal read out in response to the conductive pulse is higher than the gain with respect to a signal read out in response to the intermediate-level pulse.

6. The apparatus according to claim 1, wherein using and not-using a signal read out in response to the intermediate-level pulse in image formation are switchable depending on a quantity of light incident on the pixels.

7. An apparatus comprising:
a plurality of pixels each having a photoelectric conversion unit and a transfer transistor that transfers a charge of the photoelectric conversion unit;
an amplification unit configured to receive the transferred charge;
a scanning unit configured to supply, to a gate of the transfer transistor, a conductive pulse, a non-conductive pulse, and an intermediate-level pulse having a peak value between the conductive pulse and the non-conductive pulse;
a readout circuit disposed downstream of the amplification unit, the readout circuit including an amplifier circuit having a variable gain;
a generating unit configured to generate an image signal using a signal based on a charge transferred in response to the conductive pulse and the intermediate-level pulse; and
a control unit configured to change at least one of a pulse width of the intermediate-level pulse and the peak value in accordance with the gain,
wherein the conductive pulse and the intermediate-level pulse are supplied to the transfer transistor during a light shielding period of the photoelectric conversion unit.

8. The apparatus according to claim 7, wherein image signals for one frame are generated using signals based on charges transferred in response to a plurality of the intermediate-level pulses.

9. The apparatus according to claim 7, wherein a quantity of light incident on the photoelectric conversion unit is controlled by a mechanical shutter.

10. The apparatus according to claim 7, wherein the gain with respect to a signal read out in response to the conductive pulse is higher than the gain with respect to a signal read out in response to the intermediate-level pulse.

11. The apparatus according to claim 7, wherein using and not-using a signal read out in response to the intermediate-level pulse in image formation are switchable depending on a quantity of light incident on the pixels.

* * * * *